United States Patent [19]
Choi

[11] Patent Number: 5,566,211
[45] Date of Patent: Oct. 15, 1996

[54] AUTOMATIC FREQUENCY CONTROL METHOD AND APPARATUS THEREFOR

[75] Inventor: Yang-seok Choi, Seoul, Rep. of Korea

[73] Assignee: Samsung Electronics Co., Ltd., Kyungki-do, Rep. of Korea

[21] Appl. No.: 411,211

[22] Filed: Mar. 27, 1995

[30] Foreign Application Priority Data

Mar. 25, 1994 [KR] Rep. of Korea .......................... 94-6089
Mar. 25, 1994 [KR] Rep. of Korea .......................... 94-6090

[51] Int. Cl.$^6$ ................................................. H04L 27/22
[52] U.S. Cl. .......................... 375/332; 375/344; 329/304; 455/164.1; 455/192.2
[58] Field of Search ...................................... 375/375, 344, 375/80, 82, 326, 327, 329, 332, 344; 329/387, 304, 307; 455/164.1, 164.2, 182.2, 192.2

[56] References Cited

U.S. PATENT DOCUMENTS

| | | | |
|---|---|---|---|
| 4,527,278 | 7/1985 | Deconche et al. | 375/97 |
| 4,879,728 | 11/1989 | Tarallo | 375/80 |
| 4,896,336 | 1/1990 | Henely et al. | 375/80 |
| 4,943,982 | 7/1990 | O'Neil, II et al. | 375/81 |
| 5,241,567 | 1/1991 | Shimakata | 375/82 |
| 5,255,290 | 10/1993 | Anvari | 375/97 |

OTHER PUBLICATIONS

AFT Tracking Algorithms, Francis D. Natali, IEEE Transactions on Communication, COM–32, No. 8, Aug. 1984, pp. 935–947.

WAM 11.8, A new QPSK Demondulator for Digital DBS Receivers, Ishikawa et al., Video & Electronics Media Engineering Lab. Toshiba Corporation, IEEE 1992, pp. 192–193.

*Primary Examiner*—Stephen Chin
*Assistant Examiner*—Don Vo
*Attorney, Agent, or Firm*—Sughrue, Mion, Zinn, Macpeak & Seas

[57] ABSTRACT

An automatic frequency control apparatus used in an MPSK communication system detects a frequency offset between a carrier and a local oscillation signal for adjustment of a local oscillation frequency. A phase difference detector generates a first phase difference detection signal having, as a phase value, a difference between the phases of various samples of the sampled signal. A phase altering unit generates a second phase difference detection signal having a phase value different from that of the first phase difference detection signal. A frequency offset signal generator estimates transmission phase information by using the phase value of the second phase difference detection signal and reference phase signals used for MPSK modulation, thereby generating a frequency offset signal which is determined by the transmission phase signal and the second phase difference detection signal. The result is that the number of the reference phases which are used for determination of the transmission phase information by altering the phase of the phase difference signal, is reduced. Accordingly, the hardware cost for implementing the apparatus can be lowered. The invention can be used for automatic frequency control in a modem which is used for all the types of MPSK modulation.

25 Claims, 6 Drawing Sheets

AUTOMATIC FREQUENCY CONTROL METHOD AND APPARATUS THEREFOR

BACKGROUND OF THE INVENTION

1. Field of the Invention

The present invention relates to an automatic frequency control method and an apparatus therefor, and more particularly, to an automatic frequency control technology which is used for detecting sync signals within a signal which is modulated and transmitted according to M-ary phase-shift-keying (MPSK).

2. Description of the Related Art

In the field of communication technology, a receiver employing a sync detection method detects a sync signal within a received signal and then demodulates the signal. It is possible to perfectly detect the sync signal and to perfectly demodulate the received signal into an original signal when both the frequency and the phase of a local carrier signal are the same as those of a modulated carrier signal. Thus, both the frequency and the phase of a local carrier signal should be synchronized, respectively, with those of a modulated carrier signal. A conventional technology of detecting the sync from the received signal will be described below with reference to FIGS. 1, 2A and 2B.

FIG. 1 shows an automatic frequency control apparatus for general quadrature phase-shift-keying (QPSK) demodulation. In FIG. 1, a received signal is input to multipliers 11 and 12. Each multiplier 11 and 12 multiplies the received signal by an output signal from a voltage controlled oscillator 19. Multipliers 11 and 12 generate signals having phases different from each other by 90°. The outputs of multipliers 11 and 12 are low-frequency-converted into baseband signals by low-pass filters 13 and 14, respectively. When the received signal does not include Gaussian noise, the received signal can be expressed by the following equation: $S(t)=A \cos \omega_0 t+\phi(t)$. Here, $S(t)$ is a signal which is a function of time t, where A is an amplitude, $\omega_0$ is a frequency, and $\phi(t)$ is a phase which is also a function of time t. In this case, low-pass filter 13 generates an in-phase (I) channel signal which is represented by the equation: $I(t)=A \cos (\Delta\omega t+\phi(t))$.

On the other hand, low-pass filter 14 generates a quadrature (Q) channel signal which is represented by the equation: $Q(t)=A \sin (\Delta\omega t+\phi(t))$. Here, A is an amplitude, $\Delta\omega$ is a frequency difference, and $\phi(t)$ is a phase which is a function of time t. Signals $I(t)$ and $Q(t)$ after passing through low-pass filters 13 and 14 are digitally converted by analog-to-digital converters 15 and 16, respectively. The output signals $I_k$ and $Q_k$ of analog-to-digital converters 15 and 16 are transmitted for signal demodulation and simultaneously supplied to a frequency detector 17. The output signals $I_k$ and $Q_k$ of analog-to-digital converters 15 and 16 have a phase $\phi(t)$ which is varied for every symbol period $T_b$. For example, in case of the QPSK method, phase $\phi(t)$ has a value of one of 45°, 135°, −45° and −135°, in which $\phi(t)$ is varied for each symbol period $T_b$ according to bit-stream information from a transmitter end.

Frequency detector 17 receives two channel signals $I_k$ and $Q_k$ and generates a frequency offset signal $V(k)$. Frequency offset signal $V(k)$ is generated when the frequency of a local oscillator does not match the frequency of the received signal in the actual apparatus. Frequency offset signal $V(k)$ passes through a loop filter 18, and then is supplied to a voltage controlled oscillator (VCO) 19. VCO 19 generates local oscillation signals having different frequencies, based on the input frequency offset signal $V(k)$. The local oscillation signals are supplied to multipliers 11 and 12, and are used for generating an I-channel signal and a Q-channel signal, each signal having a 90° phase difference from the other. By repeating such a process, both the frequency and the phase of the internally generated oscillation signals are synchronized with those of the received signal.

The technologies of detecting the frequency offset information are described in the following references:

[1] AFC Tracking Algorithms (IEEE Trans. on Communications, Vol. COM-32, No. 8, August 1984, pp. 935–947); and

[2] A New QPSK Demodulator For Digital DBS Receivers (IEEE 1922, pp. 192–193).

FIG. 2A shows a circuit which employs a cross-product means disclosed in the above reference [1] as the frequency detector 17 of FIG. 1. When the sampled and digitally converted I-channel and Q-channel signals $I_k$ and $Q_k$ are input to the circuit shown in FIG. 2, I-channel signal $I_k$ is supplied to a delay 21 and multiplier 24, while Q-channel signal $Q_k$ is supplied to a delay 22 and multiplier 23. Multiplier 23 multiplies the delayed I-channel signal $I_{k-1}$ by Q-channel signal $Q_k$, while multiplier 24 multiplies the delayed Q-channel signal $Q_{k-1}$ by I-channel signal $I_k$. A subtractor 25 subtracts output signal $I_k \cdot Q_{k-1}$ of multiplier 24 from output signal $Q_k \cdot I_{k-1}$ of multiplier 23. Subtractor 25 generates a frequency offset signal $V(k)$ which is determined by a sampling period $T_s$, where frequency offset signal $V(k)$ is generated according to the following equation (1).

$$V(k)=A^2 \sin (\Delta\omega T+\theta_k) \qquad (1)$$

Here, $\Delta\omega=\omega_1-\omega_0$, $\phi_{(t)}=\phi_k$, $kT_s \leq t \leq (k-1)T_s$, and $\theta_k=\phi_k-\phi_{k-1}$. When $T_s<T_b$ (where $T_b=nT_s$), that is, when the input signal is oversampled, frequency offset signal $V(k)$ generated by subtractor 25 is expressed by the following equation (2).

$$V(k)=A^2 \sin (\Delta\omega T_s), \text{ if } k \neq nl \text{ (l is an integer), and}$$

$$V(k)=A^2 \sin (\Delta\omega T_s+\theta_1), \text{ if } k=nl \text{ (l is an integer)} \qquad (2)$$

FIG. 2B shows a frequency detector using an arc-tangent means which is disclosed in reference [2]. Arc-tangent means 27 receives two channel signals $I_k$ and $Q_k$ and performs an arc-tangent operation using Q-channel signal $Q_k$ as a numerator and I-channel signal $I_k$ as a denominator. A differentiator 28 generates a frequency offset signal $V(k)$ which is expressed by the following equations (3) and (4), based on the output signal from arc-tangent means 27.

$$V(k)=\Delta\omega T_s+\theta_k \qquad (3)$$

$$V(k)=\Delta\omega T_s, \text{ if } k \neq nl \text{ (l is an integer), and}$$

$$V(k)=\Delta\omega T_s+\theta_1, \text{ if } k=nl \text{ (l is an integer)} \qquad (4)$$

The above equation (3) represents an output signal of differentiator 28 when $T_s=T_b$. The above equation (4) represents an output signal of differentiator 28 when $T_s<T_b$ (where $T_b=nT_s$), that is, when the signal is oversampled. To detect an exact frequency, it is not desirable to include terms of $\theta_k$ and $\theta_1$ of which the values are varied according to the transmitted information. However, as it can be seen from the above equations (1) and (3), when the sampling frequency equals the symbol rate, frequency offset signal $V(k)$ includes a transmission phase value $\theta_k$. Therefore, it becomes impossible to detect the exact frequency which is proportional to only frequency offset information $\Delta\omega T$. Also, when the oversampled sample has a symbol transition, transmission phase value $\theta_k$ exists in frequency offset signal V(k), which interferes with the exact frequency detection. Although the performance of the frequency detection can be enhanced according to a degree of oversampling thereof, such oversampling causes an increased cost of hardware for oversampling when the symbol rate is more than 20 MHz as in a direct broadcasting satellite (DBS). Such a problem occurs in a differentiator automatic frequency control apparatus, as well as in a discrete Fourier transform automatic frequency control apparatus.

SUMMARY OF THE INVENTION

Therefore, to solve the above problems, it is an object of the present invention to provide an automatic frequency control method for detecting frequency offset information. More particularly, the present invention reduces the number of reference phase signals used for phase detection of a transmitted signal, by altering the phase difference between sampled signals which are detected from a phase-shift keying modulated signal into another phase difference. The phase of the transmitted signal is determined by using the altered phase difference.

It is another object of the present invention to provide an automatic frequency control apparatus for detecting frequency offset information, and in particular, reducing the number of reference phase signals which are used for phase detection of a transmitted signal. The phase of the transmitted signal is determined by using an altered phase difference obtained by altering a phase difference between phase-shift-keying modulated signals.

To accomplish the above object of the present invention, there is provided an automatic frequency control method for receiving an M-ary phase-shift-keying modulated signal, detecting a frequency offset signal and controlling an oscillated frequency based on the detected frequency offset signal, the automatic frequency control method comprising the steps of:

sampling the received signal with a predetermined sampling frequency and generating a sampled complex signal;

detecting a phase difference value between the sampled complex signal and a previously received sampled complex signal, to generate a first phase difference detection signal having a phase value corresponding to the detected phase difference value;

altering the detected phase difference value of the first phase difference detection signal by a phase altering factor, to generate a second phase difference detection signal having a phase value corresponding to the altered phase difference value;

determining transmission phase information of the received signal by using the altered phase difference value of the second phase difference detection signal and reference phase values used for information transmission of the M-ary phase-shift-keying modulation signal; and generating the frequency offset signal by using the determined transmission phase information and the altered phase difference value.

To accomplish the other object of the present invention, there is provided an automatic frequency control apparatus for receiving an M-ary phase-shift-keying modulated signal, detecting a frequency offset signal and controlling a frequency oscillator based on the detected frequency offset signal, the automatic frequency control apparatus comprising:

a sampler for sampling the received signal with a predetermined sampling frequency and generating a currently sampled complex signal;

a phase difference detector for receiving the currently sampled complex signal and detecting a phase difference value between the currently sampled complex signal and a previously received sampled complex signal, to generate a first phase difference detection signal having a phase value equal to the detected phase difference value;

a phase difference altering unit for altering the detected phase difference value of the first phase difference detection signal by a phase altering factor, and generating a second phase difference detection signal having a phase value equal to the altered phase difference value;

a circuit for determining transmission phase information from the altered phase difference value by using the altered phase difference value of the second phase difference detection signal and reference phase values used for information transmission in the M-ary phase-shift-keying modulation; and a generator for generating the frequency offset signal based on the determined transmission phase information and the altered phase difference value.

BRIEF DESCRIPTION OF THE DRAWINGS

The preferred embodiments am described with reference to the drawings wherein.

DETAILED DESCRIPTION OF THE PREFERRED EMBODIMENTS

Preferred embodiments of the present invention are described below in more detail with reference to FIGS. 3 through 8.

Figure 1:
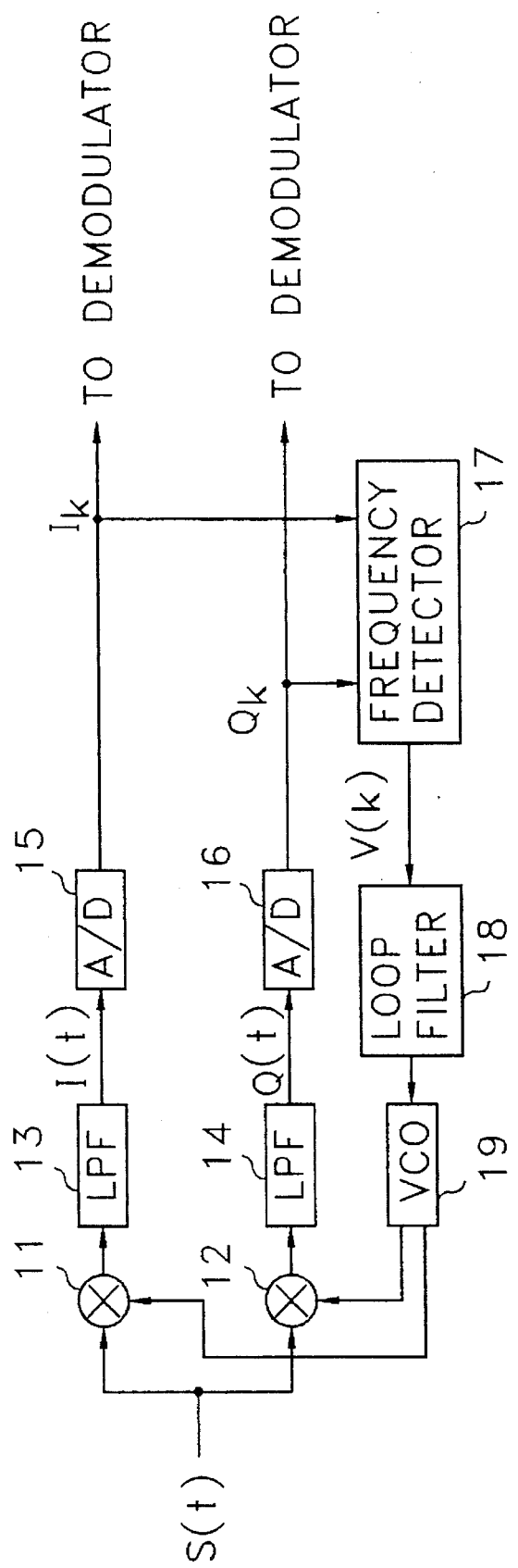
FIG. 1 is a block diagram of an automatic frequency control apparatus for general quadrature phase-shift-keying (QPSK) demodulation.
Figure 2A:
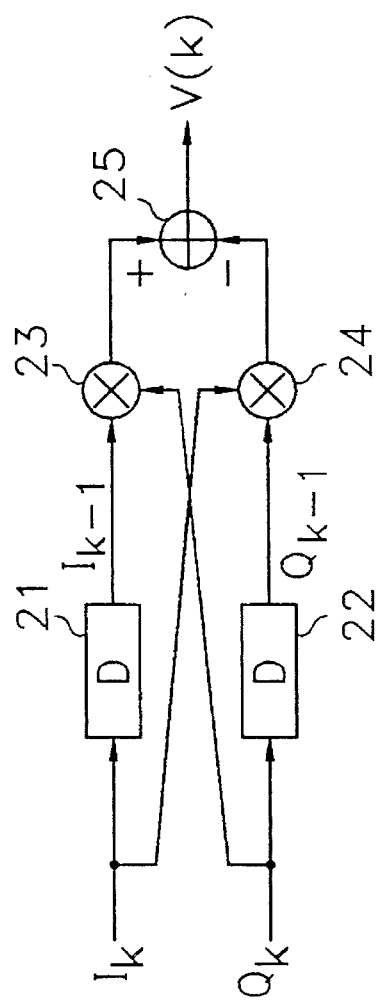
FIGS. 2A and 2B are schematic diagrams of conventional frequency detectors.
Figure 2B:
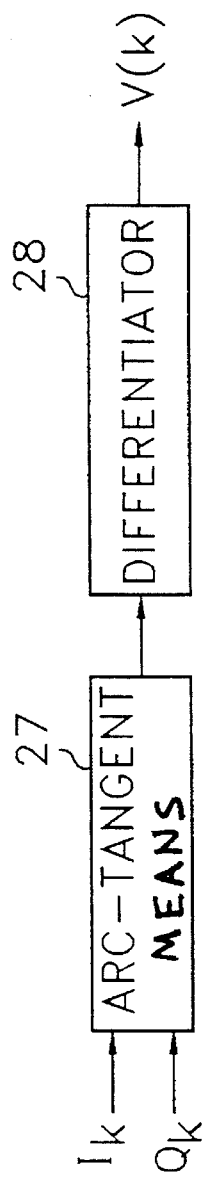
Figure 3:
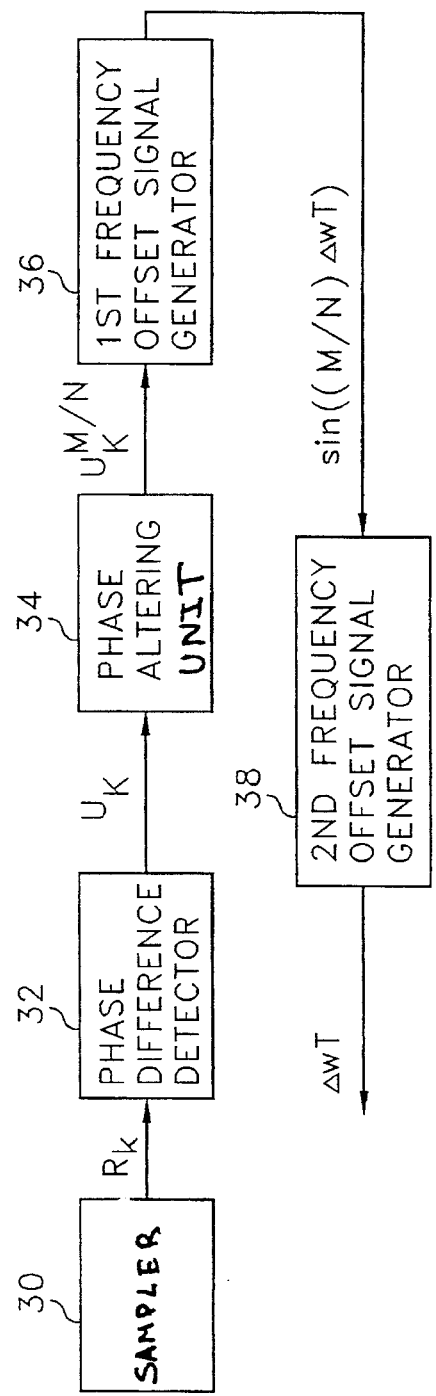
FIG. 3 is a block diagram of a frequency detector according to a preferred embodiment of the present invention.

FIG. 3 shows a frequency detector according to a preferred embodiment of the present invention. The apparatus shown in FIG. 3 includes a sampler 30, a phase difference detector 32, a phase altering unit 34 and first and second frequency offset signal generators 36 and 38. A M-ary PSK (MPSK) modulated signal has transmission phase information $\theta_k$ which is varied based on the transmitted information. The transmission phase information $\theta_k$ becomes one of a plurality of reference phases $\Psi_i$ for transmission of the PSK modulated information. If the MPSK modulated signal is received, a receiver (not shown) demodulates the received signal. Sampler 30 samples the input signal with a sampling frequency which is equal to a symbol rate and outputs the sampled result $R_k$. The currently sampled signal $R_k$ includes noise and frequency offset information $\Delta\omega T$, and can be expressed by the following equation (5) when the magnitude $r_k'$ is varied due to the noise.

$$R_k \equiv I_k + jQ_k = r_k' \cdot e^{j(\Psi k + \Delta\omega Tk)} \quad (5)$$

If the currently sampled complex signal $R_k$ is applied to phase difference detector 32, phase difference detector 32 normalizes the sampled complex signal $R_k$ according to the following equation (6), to generate a first phase difference detection signal $U_k$. That is, using the stored previously-sampled complex signal $R_{k-1}$, the currently sampled complex signal $R_k$ is normalized to generate first phase difference detection signal $U_k$.

$$U_k \equiv \frac{R_k R_{k-1}^*}{|R_k| \cdot |R_{k-1}|} = e^{j(\Psi_k - \Psi_{k-1} + \Delta\omega T)} = \quad (6)$$

$$e^{j(\Theta_k + \Delta\omega T)} = C_k + jS_k$$

Here, $C_k$ is a real component signal, $S_k$ is an imaginary component signal.

As it can be seen from equation (6), first phase difference detection signal $U_k$ compensates for a magnitude of the distorted signal due to the noise. The present invention is not limited to an operation of the normalization by phase difference detector 32. Thus, it is possible for phase difference detector 32 to generate another first phase difference detection signal $U_k'$ from signals ($R_k, R_{k-1}$) by using a complex conjugate operation according to the equation $U_k' = R_k R^*_{k-1}$.

Further, components 34, 36 and 38, to be described later, can be constructed in order to also operate well for the case in which a new first phase difference detection signal $U_k'$ is generated. If the phase difference value of first phase difference detection signal $U_k$ is $\angle U_k$, phase difference value $\theta_k + \Delta\omega T$, which is calculated by the normalization or the complex conjugate operation, then the following equations (7) and (8) are always satisfied.

$$\angle U_k = \theta_k + \Delta\omega T \quad (7),$$

or $$\Delta\omega T = \angle U_k - \theta_k \quad (8)$$

Thus, if transmission phase information $\theta_k$ which is varied according to the transmitted information is known, it is possible to precisely calculate frequency offset information $\Delta\omega T$.

Generally, transmission phase information $\theta_k$ is not a sequentially varying value, and is quantized with a reference phase of the MPSK signal in order to be transmitted. Thus, the quantized transmission phase information $\theta_k$ can have a reference phase value $\Psi_i$ as can be seen from the following equation (9).

$$\theta_k \in \{\Psi_i | \Psi_i = 0, \pm(2/M)\pi, \pm(4/M)\pi, \pm(6/M)\pi, \ldots, \pm((M-2)/M)\pi, \pi; \text{ in the case of MPSK}\} \quad (9)$$

Therefore, when first phase difference detection signal $U_k$ has frequency offset information $\Delta\omega T$ within an allowable range in a frequency control apparatus, transmission phase information $\theta_k$ can be exactly detected. However, as the value of M increases in the above equation (9), a slicer (not shown) being a conventional circuit for estimating transmission phase information $\theta_k$, becomes complicated. To solve such a problem, phase altering unit 34 alters phase $\theta_k + \Delta\omega T$ of first phase difference detection signal $U_k$ according to the following equation (10).

$$U_k^{\frac{M}{N}} = e^{j\frac{M}{N}(\theta_k + \Delta\omega T)} = e^{j(\frac{M}{N}\theta_k + \frac{M}{N}\Delta\omega T)} \equiv C_k + jS_k \quad (10)$$

Here, M is a multiple of N, that is, M=lN where l is a positive integer. Phase altering unit 34 receives first phase difference detection signal $U_k$ and alters the phase difference value expressed as equation (7) into $[M/N](\theta_k + \Delta\omega T)$, and generates a second phase difference detection signal $U_k^{M/N}$. Thus, if $[M/N](\theta_k + \Delta\omega T)$ exists within a range expressed by the following equation (11), a value $\Psi_i$ of the altered transmission phase information $[M/N]\theta_k$ can be estimated from the above equation (9).

$$-\frac{\pi}{N} < \frac{M}{N}\Delta\omega T < \frac{\pi}{N} \quad (11)$$

First frequency offset signal generator 36 receives second phase difference detection signal $U_k^{M/N}$ from phase altering unit 34, estimates a value of the altered transmission phase information $[M/N]\theta_k$, and generates first frequency offset signal sin $([M/N]\Delta\omega T)$ based on the estimated transmission phase information $\Psi_i$. First frequency offset signal sin $([M/N]\Delta\omega T)$ is calculated according to the following equation (12).

$$\sin\left(\frac{M}{N}\Delta\omega T\right) = Im[U_k^N \cdot e^{-j\Psi_i}] = S_k\cos\Psi_i - C_k\sin\Psi_i \quad (12)$$

Thus, a person skilled in the art related to the present invention can, within the scope of the present invention, make a variety of types of frequency offset signal generators that embody equation (12), in which second phase difference detection signal $U_k^{M/N}$ is used and which estimates transmission phase information $\Psi_i$.

Figure 4:
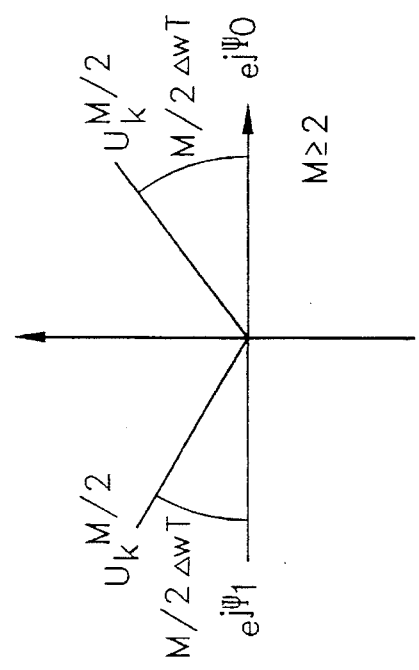
FIG. 4 is a graphic diagram for explaining the determination of transmission phase information for the frequency detector shown in FIG. 3.

For explanation of a more specific example, an operation of first frequency offset signal generator 36 is described below with reference to FIG. 4, in which N=2 and M≧N. A reference phase $\Psi_i$, which the altered transmission phase information $[M/2]\theta_k$ can be equal to when N=2, is one of $\Psi_0=0$ and $\Psi_1=\pi$ as set forth in the above equation (9). Such a reference phase $\Psi_i$ is shown in FIG. 4. Thus, when frequency offset information $([M/2]\Delta\omega T)$ exists within a range expressed by the following equation (13), first frequency offset signal generator 36 uses the input altered phase difference value $\angle U_k^{M/2}$ and can estimate the altered transmission phase information $([M/2]\theta_k)$.

$$-\frac{\pi}{2} < \frac{M}{2}\Delta\omega T < \frac{\pi}{2} \quad (13)$$

Phase altering unit 34, which is appropriately constructed for when N=2, outputs phase difference detection signal $U_k^{M/2}$ comprising a real component signal $C_{k,2}$ and an imaginary component signal $S_{k,2}$. First frequency offset signal generator 36 receives real component signal $C_{k,2}$ and imaginary component signal $S_{k,2}$ to generate frequency offset signal sin $([M/2]\Delta\omega T)$.

At the beginning, first frequency offset signal generator 36 determines a sign of the input real component signal $C_{k,2}$ in order to determine the altered transmission phase information ($[M/2]\theta_k$). If real component signal $C_{k,2}$ has a positive value, a reference phase $\Psi_0$ for transmission phase information ($[M/2]\theta_k$) has a value of zero, while if real component signal $C_{k,2}$ has a negative value, a reference phase $\Psi_1$ for transmission phase information ($[M/2]\theta_k$) has a value of $\pi$. According to equation (12), when ($[M/2]\theta_k$)=0, sin ($[M/2]\Delta\omega T$) equals $S_k$, while when ($[M/2]\theta_k$)=$\pi$, sin ($[M/2]\Delta\omega T$) equals $-S_k$. Thus, first frequency offset signal generator 36 generates frequency offset signal sin ($[M/2]\Delta\omega T$) equal to either $S_{k,2}$ or $-S_{k,2}$, which is determined by a sign of real component signal $C_{k,2}$.

Even when only first frequency offset signal sin ($[M/N]\Delta\omega T$) will be used, exact frequency offset information which does not include the transmission phase information can be also obtained. However, to eradicate the sine function which is included in first frequency offset signal sin ($[M/N]\Delta\omega T$), second frequency offset signal generator 38 is used. If the first frequency offset signal generator 36 generates first frequency offset signal sin ($[M/N]\Delta\omega T$), then second frequency offset signal generator 38 generates second frequency offset signal ($\Delta\omega T$), according to the following equation (14).

$$\Delta\omega T = \frac{N}{M} \sin^{-1}(S_K \cos\Psi_i - C_K \sin\Psi_i) \quad (14)$$

Either first frequency offset signal sin ($[M/2]\Delta\omega T$) or second frequency offset signal $\Delta\omega T$ can be used for sync detection in the receiver.

Figure 6:
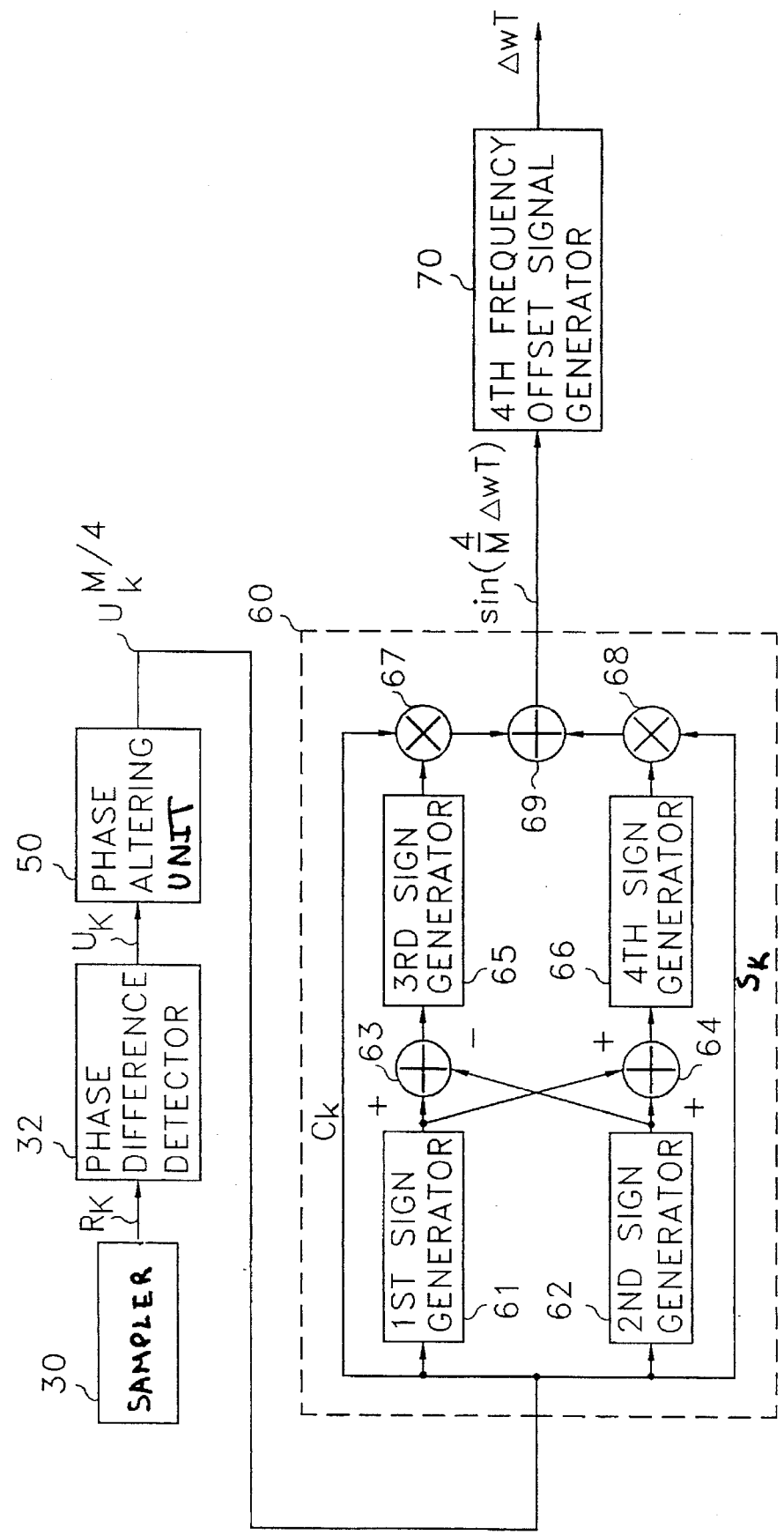
FIG. 6 is a block diagram of a frequency detector according to another preferred embodiment of the present invention.

FIG. 6 shows a frequency detector according to another preferred embodiment of the present invention. The apparatus shown in FIG. 6 is one implemented for when N=4 and M≧N in equation (10), set forth above. In FIG. 6, sampler 30 and phase difference detector 32 perform the same functions as those of the corresponding blocks having the same reference numerals shown in FIG. 3. Accordingly, the detailed descriptions thereof will be omitted. Phase altering unit 50 which receives first phase difference detection signal $U_k$ uses the above equation (10) to generate phase difference detection signal $U_k^{M/4}$ which has an altered phase difference value $[M/4](\theta_k+\Delta\omega T)$, from phase difference detection signal $U_k$ which has phase difference value $\angle U_k$. Phase altering unit 50 outputs phase difference detection signal $U_k^{M/4}$ as a signal having a real component signal $C_{k,4}$ and an imaginary component signal $S_{k,4}$. A third frequency offset signal generator 60 includes sign generators 61, 62, 65 and 66, subtractor 63, adders 64 and 69 and multipliers 67 and 68. Third frequency offset signal generator 60 receives real component signal $C_{k,4}$ and imaginary component signal $S_{k,4}$ to determine the altered transmission phase information $[M/4]\theta_k$, and to then generate frequency offset signal sin ($[M/4]\Delta\omega T$). When N=4, reference phase $\Psi_i$ satisfying the above equations (9) and (10) is expressed by four values according to the following equation (15).

$$\frac{M}{4}\theta_k \in \left\{ \Psi_i | \Psi_i = 0, \pm\frac{\pi}{2}, \pi \right\} \quad (15)$$

Figure 7:
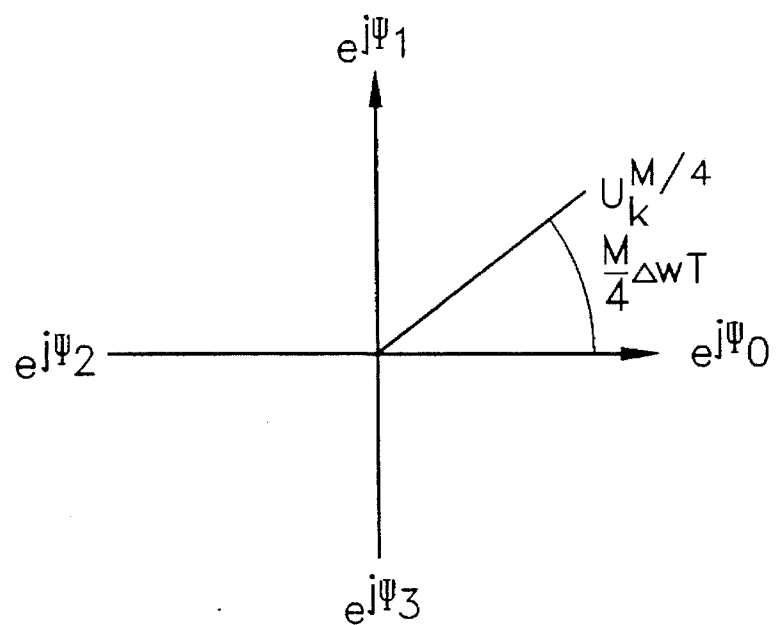
FIG. 7 is a graphic diagram for explaining the determination of transmission phase information for the frequency detector shown in FIG. 5.

That is, reference phase $\Psi_i$, which the transmission phase information $[M/4]\theta_k$ can take when N=4, is one of $\Psi_0=0$, $\Psi_1=\pi/2$, $\Psi_2=\pi$ and $\Psi_3=-\pi/2$ as shown above in equation (15). Such a reference phase $\Psi_i$ is shown in FIG. 7. Thus, when frequency offset information ($[M/4]\Delta\omega T$) exists within the range expressed by the following equation (16), third frequency offset signal generator 60 uses the input altered phase difference value $\angle U_k^{M/4}$ and can estimate the altered transmission phase information ($[M/4]\theta_k$).

$$-\frac{\pi}{4} < \frac{M}{4} \Delta\omega T < \frac{\pi}{4} \quad (16)$$

Real component signal $C_{k,4}$ and imaginary component signal $S_{k,4}$ output from phase altering unit 50 are applied to first and second sign generators 61 and 62. Also, real component signal $C_{k,4}$ is applied to first multiplier 67, and imaginary component signal $S_{k,4}$ is applied to second multiplier 68. First sign generator 61 generates a first sign signal being a value of a signum function with respect to the difference $C_{k,4}-S_{k,4}$ between real component signal $C_{k,4}$ and imaginary component signal $S_{k,4}$, while second sign generator 62 generates a second sign signal being a value of a signum function with respect to sum $C_{k,4}+S_{k,4}$ of real component signal $C_{k,4}$ and imaginary component signal $S_{k,4}$. Subtractor 63 receives the first and second sign signals and subtracts the second sign signal from the first sign signal, thereby outputting the result. First adder 64 receives the first and second sign signals and adds the second sign signal to the first sign signal, thereby outputting the result. Third sign generator 65 receives the output signal of subtractor 63 and generates a third sign signal which is a value of a signum function. Fourth sign generator 66 receives the output signal of first adder 64 to generate a fourth sign signal which is a value of a signum function. First multiplier 67 receives the third sign signal and real component signal $C_{k,4}$ and multiples the received signals by each other to output the result, while second multiplier 68 receives the fourth sign signal and imaginary component signal $S_{k,4}$ and multiplies the received signals by each other to output the result. Second adder 69 receives the output signals of multipliers 67 and 68 and adds the received signals to each other to generate a first frequency offset signal sin ($[M/4]\Delta\omega T$). Fourth frequency offset signal generator 70 receives the first frequency offset signal and generates second frequency offset signal $\Delta\omega T$, according to equation (17), as set forth below.

$$\Delta\omega T = \frac{4}{M} \sin^{-1}(S_K \cos\Psi_i - C_K \sin\Psi_i) \quad (17)$$

Either the frequency offset signal sin ($[M/4]\Delta\omega T$) or $\Delta\omega T$ can be used for sync detection by the receiver.

Figure 5:
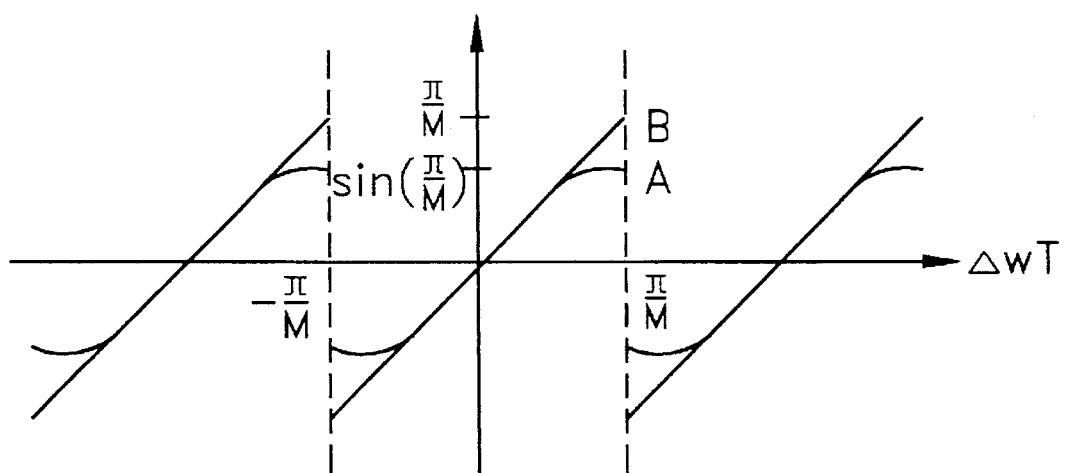
FIG. 5 is a graphic diagram of discriminating curves for illustrating the frequency offset information of FIG. 3.
Figure 8:
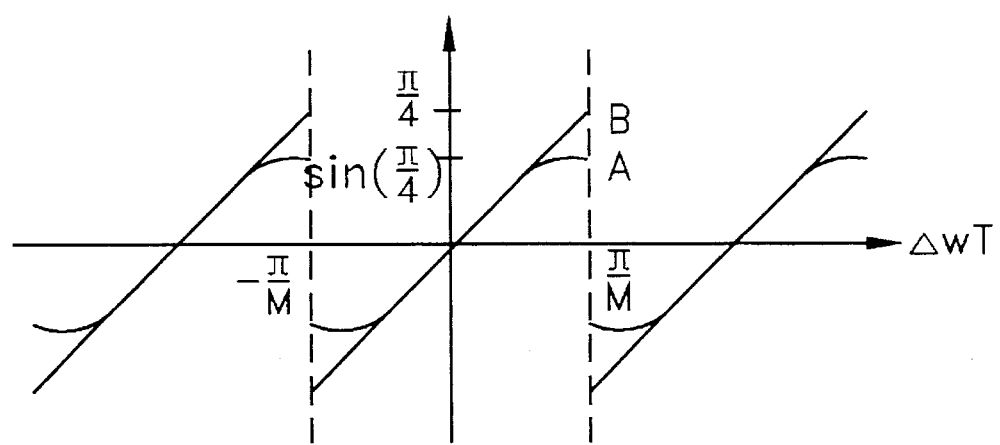
FIG. 8 is a graphic diagram of discriminating curves for illustrating the frequency offset information of FIG. 6.

FIGS. 5 and 8 show discriminating curves for illustrating the frequency offset signals which are generated by frequency offset signal generators 36, 38, 60 and 70 shown in FIGS. 3 and 6, respectively. The characteristic curves of FIGS. 5 and 8 are obtained by discriminators (not shown) under the conditions of $|\Delta\omega T|<\pi/M$, $|\Delta f_s|<f_s/2M$, and $f_s=1/T_b$. The curves shown in FIGS. 5 and 8 are obtained by discriminators which have a curve "A" for frequency offset signal sin ($[M/4]\Delta\omega T$) and a curve "B" for frequency offset signal $\Delta\omega T$. The discriminator curve "A" becomes nonlinear near a boundary point $\pi/M$. However, since the discriminator "A" is useful for detecting the frequency offset information in the apparatus, frequency offset signal sin ($[M/4]\Delta\omega T$) can be used as the frequency offset information. If frequency offset signal $\Delta\omega T$ is used, it is possible to detect more exact frequency offset information, although the amount of calculation required increases.

The present invention detects a frequency offset signal which is generated by a mismatch between the carrier frequency and the local oscillation frequency or by the Doppler-shift in the MPSK communication system. In particular, the signal which is sampled with a sampling frequency corresponding to the symbol rate is used. By altering the detected phase difference value, the number of the reference phases which are used to determine the transmission phase information is decreased. Accordingly, the present invention can lower the hardware cost of the apparatus. Further, the present invention can be used for automatically controlling frequencies in a modem which uses all types of MPSK modulation.

While only certain embodiments of the invention have been specifically described herein, it is apparent that numerous modifications may be made thereto without departing from the spirit and scope, of the invention.

What is claimed is:

1. An automatic frequency control method for receiving an M-ary phase-shift-keying modulated signal, detecting a frequency offset signal and controlling a frequency oscillator based on the detected frequency offset signal, said automatic frequency control method comprising the steps of:

sampling the received signal with a predetermined sampling frequency and generating a sampled complex signal, detecting a phase difference value between the sampled complex signal and a previously received sampled complex signal, to generate a first phase difference detection signal having a phase value corresponding to the detected phase difference value;

altering the detected phase difference value of the first phase difference detection signal by a predetermined phase altering factor, to generate a second phase difference detection signal having a phase value corresponding to the altered phase difference value;

determining transmission phase information of the received signal by using the altered phase difference value of the second phase difference detection signal and reference phase values used for information transmission of the M-ary phase-shift-keying modulation signal; and generating the frequency offset signal by using the determined transmission phase information and the altered phase difference value.

2. An automatic frequency control method according to claim 1, wherein said sampling frequency is equal to a symbol rate of the received signal.

3. An automatic frequency control method according to claim 1, wherein said first phase difference detection signal generation step generates the first phase difference detection signal $U_k$ having the phase value equal to the phase difference value $(\theta_k + \Delta\omega T)$ based on the sampled complex signal $R_k$ and the previously received sampled complex signal $R_{k-1}$, according to the following equation:

$$U_k \equiv \frac{R_k R^*_{k-1}}{|R_k| \cdot |R_{k-1}|} = e^{j(\theta_k + \Delta\omega T)}$$

in which $\theta_k$ is the transmission phase information and $\Delta\omega T$ is the frequency offset signal.

4. An automatic frequency control method according to claim 1, wherein said first phase difference detection signal generation step generates the first phase difference detection signal $U_k$ having the phase value equal to the phase difference value $(\theta_k + \Delta\omega T)$ based on the sampled complex signal $R_k$ and the previously received sampled complex signal $R_{k-1}$ according to the following equation:

$$U_k = R_k \cdot R^*_{k-1}$$

in which $R^*_{k-1}$ is a complex conjugate of $R_{k-1}$.

5. An automatic frequency control method according to claim 1, wherein said second phase difference detection signal generation step generates the second phase difference detection signal by multiplying the phase difference value by the phase altering factor, wherein said phase altering factor (M/N) is a ratio of the value M based on the phase-shift-keying modulated signal and a coefficient N, where M=lN where l is a positive integer.

6. An automatic frequency control method according to claim 1, wherein said transmission phase information determination step comprises the substeps of:

determining the reference phase values from among the reference phase values which are used for transmission of the information in the M-ary phase-shift-keying modulation, to which the altered phase difference value can be set; and comparing the altered phase difference value with the determined reference phase values, to select the determined reference phase value which is closest to the altered phase difference value among the determined reference phase values as the determined transmission phase information.

7. An automatic frequency control method according to claim 6, wherein said altered phase difference value comprises the frequency offset signal $((M/N)\Delta\omega T)$ and the determined transmission phase information $((M/N)\theta_k)$ which exist within the range: $-\pi/N < ((M/N)\Delta\omega T) < \pi/N$, in which M/N is the phase altering factor, N satisfies the equation: M=lN where l is a positive integer, and $\Delta\omega T$ is a frequency difference of different samples of the sampled complex signal 8. An automatic frequency control method according to claim 1, wherein said frequency offset signal generation step comprises the substeps of:

generating a complex signal having the determined transmission phase information;

multiplying the complex conjugate of the complex signal by the second phase difference detection signal; and setting the imaginary component signal of the signal obtained by multiplication as the frequency offset signal.

9. An automatic frequency control method according to claim 8, further comprising the substep of setting a value obtained by multiplying an arc-sine value of the imaginary component set as the frequency offset signal by the phase altering factor, as the frequency offset signal.

10. An automatic frequency control method according to claim 1, wherein said phase altering factor is related to M of the M-ary phase-shift-keying modulated signal.

11. An automatic frequency control apparatus for receiving an M-ary phase-shift-keying modulated signal, detecting a frequency offset signal and controlling a frequency oscillator based on the detected frequency offset signal, said automatic frequency control apparatus comprising:

a sampler for sampling the received signal with a predetermined sampling frequency and generating a currently sampled complex signal;

a phase difference detector for receiving the currently sampled complex signal and detecting a phase difference value between the currently sampled complex signal and a previously received sampled complex signal, to generate a first phase difference detection signal having a phase value equal to the detected phase difference value;

a phase difference altering unit for altering the detected phase difference value of the first phase difference detection signal by a predetermined phase altering factor, and generating a second phase difference detection signal having a phase value equal to the altered phase difference value;

a circuit for determining transmission phase information from the altered phase difference value by using the altered phase difference value of the second phase difference detection signal and reference phase values used for information transmission in the M-ary phase-shift-keying modulation; and a generator for generating the frequency offset signal based on the determined transmission phase information and the altered phase difference value.

12. An automatic frequency control apparatus according to claim 11, wherein said sampler samples the received signal with a sampling frequency which equals a symbol rate of the received signal.

13. An automatic frequency control apparatus according to claim 11, wherein said phase difference detector normalizes the currently sampled complex signal and the previously received sampled complex signal, and generates the first phase difference detection signal having a phase difference value produced by the normalization.

14. An automatic frequency control apparatus according to claim 11, wherein said phase difference detector performs a complex-conjugate operation on the currently sampled complex signal and the previously sampled complex signal, and generates the first phase difference detection signal having a phase difference value produced by the complex-conjugate operation.

15. An automatic frequency control apparatus according to claim 11, wherein said phase difference altering unit generates the second phase difference detection signal by multiplying the detected phase difference value of the first phase difference detection signal by the phase altering factor (M/N) in which the value M of the phase-shift-keying modulated signal is a numerator and a coefficient N having a relationship of an equation M=lN, where l is a positive integer, is a denominator in the phase altering factor.

16. An automatic frequency control apparatus according to claim 11, wherein said frequency offset signal generator comprises a first frequency offset signal generator for determining reference phase values in which a difference between the reference phase values and the altered phase difference value exists in the range;

$$-\pi/N < ((M/N)\Delta\omega T) < \pi/N$$

in which the value M of the M-ary phase-shift-keying modulated signal is a numerator and a coefficient N is a denominator, satisfying the equation: M=lN where l is a positive integer, and generating a complex signal having the determined transmission phase information, and multiplying the complex conjugate of the complex signal by the second phase difference detection signal, thereby generating the imaginary component signal of the signal obtained by the multiplication as the frequency offset signal.

17. An automatic frequency control apparatus according to claim 16, further comprising a second frequency offset signal generator for generating a new frequency offset signal by multiplying the arc-sine value of the frequency offset signal generated by said first frequency offset signal generator by the phase altering factor.

18. An automatic frequency control apparatus according to claim 11, wherein said phase altering factor is related to M of the M-ary phase-shift-keying modulated signal.

19. An automatic frequency control apparatus for receiving an M-ary phase-shift-keying modulated signal in which reference phase values are used for information transmission in the M-ary phase-shift-keying modulation, detecting a frequency offset signal and controlling an oscillation frequency based on the detected frequency offset signal, said automatic frequency control apparatus comprising:

means for sampling the received signal with a predetermined sampling frequency and generating a currently sampled complex signal;

phase difference detection means for receiving the currently sampled signal and detecting a phase difference value between the currently sampled complex signal and a previously sampled complex signal, by generating a first phase difference detection signal having a phase value equal to the detected phase difference value;

phase difference altering means for receiving the first phase difference detection signal and altering the detected phase difference value of the first phase difference detection signal by a phase altering factor M/2 with respect to the value M of the M-ary phase-shift-keying modulated signal, and generating a second phase difference detection signal $(U_k^{M/2} = C_k + jS_k)$ having a phase value equal to the altered phase difference value $((M/2)(\theta_k + \Delta\omega T))$; and means for receiving the second phase difference detection signal and determining transmission phase information $\Psi$ included in the altered phase difference value based on the altered phase difference value of the second phase difference detection signal and the reference phase values, and multiplying the second phase difference detection signal by a complex signal $e^{-j\Psi}$ to produce a signal $(S_k\cos\Psi - C_k\sin\Psi)$, and generating the frequency offset signal based on the sign of $C_k$ of an imaginary component of the signal obtained by the multiplication.

20. An automatic frequency control apparatus according to claim 19, wherein said means for generating the frequency offset signal determines the frequency offset signal to be the imaginary component signal $S_k$ when real component signal $C_k$ is greater than zero, and determines the frequency offset signal to be the imaginary component signal $-S_k$ when real component signal $C_k$ is less than zero.

21. An automatic frequency control apparatus according to claim 20, further comprising means for generating a new frequency offset signal by removing the phase altering factor M/2 and a sine function component included in the imaginary component signal $S_k$.

22. An automatic frequency control apparatus for receiving an M-ary phase-shift-keying modulated signal in which reference phase values are used for information transmission in the M-ary phase-shift-keying modulation, detecting a frequency offset signal and controlling an oscillation frequency based on the detected frequency offset signal, said automatic frequency control apparatus comprising:

means for sampling the received signal with a predetermined sampling frequency and generating a currently sampled complex signal;

phase difference detection means for receiving the currently sampled signal and detecting a phase difference value between the currently sampled complex signal and a previously sampled complex signal, to generate a first phase difference detection signal having a phase value equal to the detected phase difference value;

phase difference altering means for receiving the first phase difference detection signal and altering the detected phase difference value of the first phase difference detection signal by a phase altering factor M/4 with respect to the M of the M-ary phase-shift-keying modulated signal, and generating a second phase difference detection signal ($U_k^{M/4}=C_k+jS_k$) having a phase value equal to the altered phase difference value (($M/4)(\theta_k+\Delta\omega T)$); and means for receiving the second phase difference detection signal and generating the frequency offset signal based on real and imaginary components of the second phase difference detection signal.

23. An automatic frequency control apparatus according to claim 22, wherein the means for generating the frequency offset signal comprises:

a first sign generator for generating a first sign signal by subtracting an imaginary component of the second phase difference detection signal from a real component thereof;

a second sign generator for generating a second sign signal by adding the real and imaginary components;

a subtractor for subtracting the second sign signal from the first sign signal;

a first adder for adding the first and second sign signals;

a third sign generator for outputting a third sign signal based on the signal applied from the subtractor;

a fourth sign generator for outputting a fourth sign signal based on the signal applied from the first adder;

a first multiplier for multiplying the real component signal of the second phase difference detection signal by said third sign signal;

a second multiplier for multiplying the imaginary component of the second phase difference detection signal by said fourth sign signal; and a second adder for adding the output signals of said first and second multipliers and generating a frequency offset signal.

24. An automatic frequency control apparatus according to claim 23, further comprising means for generating a new frequency offset signal by multiplying an arc-sine value of the frequency offset signal generated by said means for generating the frequency offset signal by the phase altering factor.

25. An automatic frequency control apparatus according to claim 23, wherein said first, second, third and fourth sign signals are each values of signum functions.

* * * * *